United States Patent [19]

Matsumoto et al.

[11] Patent Number: 4,486,297

[45] Date of Patent: Dec. 4, 1984

[54] PROCESS FOR DESULFURIZING AND REFINING HYDROCARBON FRACTION CONTAINING LARGE QUANTITIES OF AROMATIC COMPONENTS

[75] Inventors: Hideyuki Matsumoto, Yokohama; Shiyouichi Bando, Handa, both of Japan

[73] Assignee: JGC Corporation, Tokyo, Japan

[21] Appl. No.: 223,783

[22] Filed: Jan. 9, 1981

[30] Foreign Application Priority Data

Jan. 12, 1980 [JP] Japan ................................ 55-2246
Oct. 7, 1980 [JP] Japan ................................ 55-140026

[51] Int. Cl.$^3$ ...................... C10G 65/06; C10G 45/08
[52] U.S. Cl. .................................. 208/211; 208/215; 208/216 R; 208/255
[58] Field of Search ................... 208/211, 215, 216 R

[56] References Cited

U.S. PATENT DOCUMENTS

| 2,394,751 | 2/1946 | Cole ................................ 208/215 |
| 3,000,816 | 9/1961 | Vernon et al. ................. 208/216 R |
| 3,094,480 | 6/1963 | Richardson ..................... 208/216 R |
| 3,457,163 | 7/1969 | Parker ............................... 208/211 |
| 3,623,973 | 11/1971 | Tarhan ............................. 208/211 |
| 3,642,927 | 2/1972 | Kovach et al. ................. 208/216 R |
| 3,756,944 | 9/1973 | Ishiguro et al. ................ 208/216 R |
| 3,948,763 | 4/1976 | Christman et al. ............ 208/216 R |
| 3,953,321 | 4/1976 | Ganster et al. ................. 208/216 R |
| 4,013,545 | 3/1977 | Hilfman ............................. 208/111 |
| 4,111,796 | 9/1978 | Yanik et al. ...................... 208/216 R |

FOREIGN PATENT DOCUMENTS

| 969121 | 6/1975 | Canada ............................... 208/211 |
| 1044771 | 10/1966 | United Kingdom ............... 208/211 |

Primary Examiner—Delbert E. Gantz
Assistant Examiner—O. Chaudhuri
Attorney, Agent, or Firm—Armstrong, Nikaido, Marmelstein & Kubovcik

[57] ABSTRACT

Desulfurization and refining of aromatic hydrocarbon fraction containing organic sulfur compounds by catalytic hydrotreating can be performed with a high desulfurization rate (99 wt. % or higher) and without a significant loss (1 mol % or less) of the aromatic components.

The improved process is characterized by preliminary sulfurization treatment of the catalyst of Co—Mo system, Ni—Mo system or Ni—Co—Mo system using thiophenes, and hydrotreating of the aromatic hydrocarbon fraction using thus treated catalyst at a relatively high temperature.

18 Claims, 1 Drawing Figure

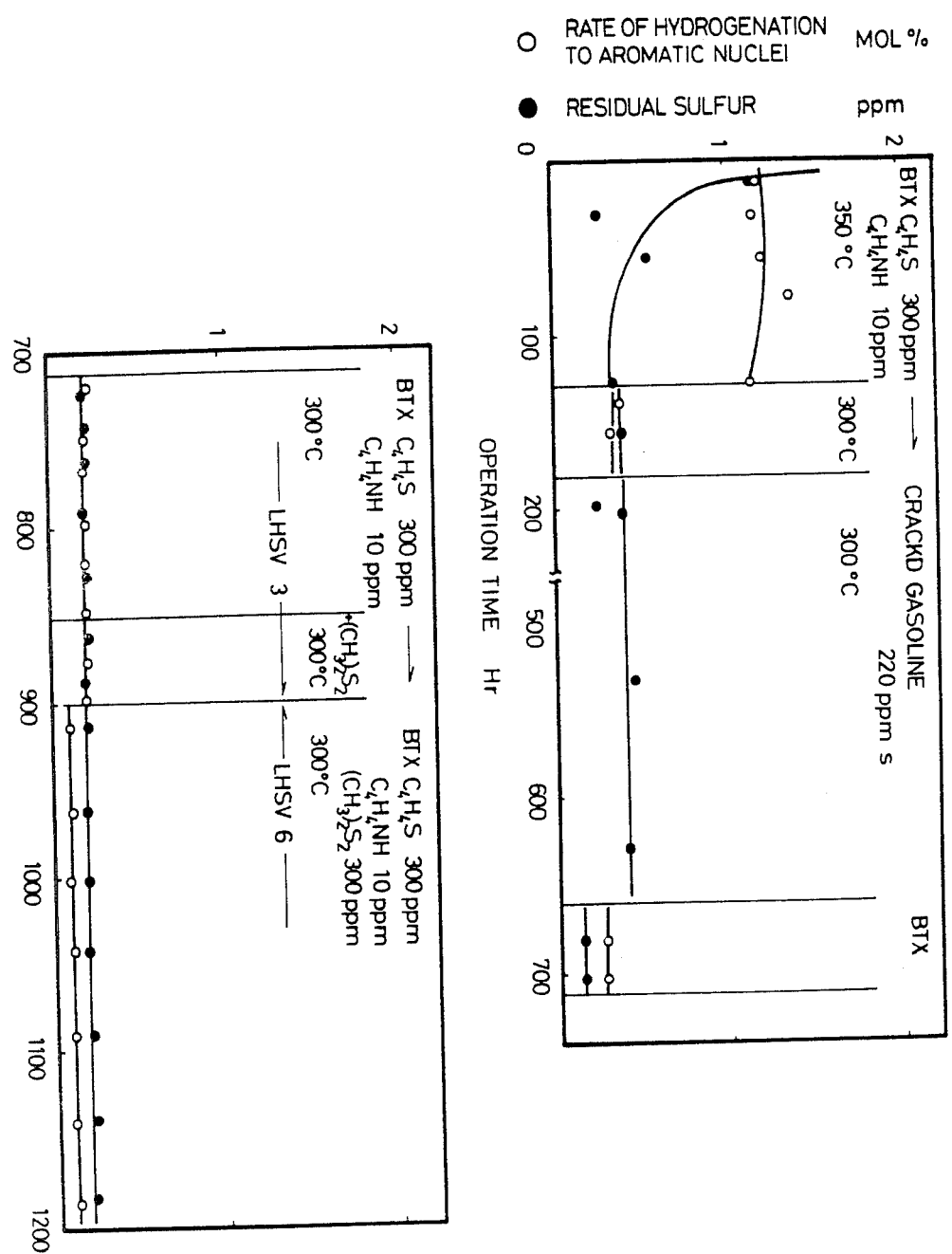

PROCESS FOR DESULFURIZING AND REFINING HYDROCARBON FRACTION CONTAINING LARGE QUANTITIES OF AROMATIC COMPONENTS

BACKGROUND OF THE INVENTION

1. Field of the Invention

The present invention relates to an improved process for desulfurizing and refining hydrocarbon fractions containing large quantities of aromatic components.

2. State of the Art

Aromatic hydrocarbons such as benzene, toluene and xylenes (hereinafter referred to collectively as "BTX") are contained in large quantities in, for example, cracked gasoline, by-product of thermal cracking of naphtha. The aromatic raw materials such as the cracked gasoline contain organic sulfur compounds as the impurities at a relatively high concentration as well, and therefore, it is necessary for effective utilization of BTX to desulfurize and refine the raw materials.

The desulfurization is usually performed by catalytic hydrotreating of the organic sulfur compounds so as to convert them to hydrogen sulfide, and then, removing the hydrogen sulfide by means of washing with alkaline aqueous solution.

Various types of catalysts are useful for the hydrotreating, and amoung them, Co—Mo system catalyst is the most popular one. The regulation on discharge of $NO_x$, which is getting more strict in recent years, requires removal of organic nitrogen compounds in the raw material oil. For the purpose of simultaneous denitrification with the desulfurization, Ni—Mo system catalyst and Ni—Co—Mo system catalyst came to be used often because of their high performance of denitrification.

The aromatic raw materials such as the cracked gasoline generally contain polymerizable compounds like diolefins as well, which quickly polymerize at a temperature at which the hydrotreating of organic sulfur compounds is conducted to cause troubles of plugging of the reaction apparatus. So, it is advantageous to convert firstly the polymerizable compounds to non-polymerizable hydrocarbons by hydrogenating them at a relatively low temperature at which the polymerization does not proceed, and then, to convert the organic sulfur compounds to hydrogen sulfide by hydrotreating at a relatively high temperature. Thus, there has been established the two-step method as a practical process, which comprises the former step, hydrogenation of the polymerizable compounds using a palladium catalyst, and the latter step, hydrotreating of the organic sulfur compounds using a Co—Mo system catalyst, a Ni—Mo system catalyst or a Ni—Co—Mo system catalyst.

The problem awaiting solution in the hydrotreating of the organic sulfur compounds using the Co—Mo system, Ni—Mo system or Ni—Co—Mo system catalyst is, in addition to how to achieve a high rate desulfurization by perfectly converting the organic sulfur compounds to hydrogen sulfide, how to decrease loss of BTX, the aimed product, by minimizing hydrogenation thereto. In general, higher activity of the hydrogenation catalyst achieves the former object, but the latter intention is difficult to realize. In fact, according to the conventional technologies, in case of desulfurization of a raw material containing organic sulfur compounds of several hundreds of ppm to decrease residual sulfur compounds to as low as 1 ppm in terms of sulfur or less, loss of BTX by hydrogenation thereto of cyclohexane or its derivatives inevitably reaches 3 mol %, or even 5 mol %. This problem is particularly serious when Ni—Mo system catalyst or Ni—Co—Mo system catalyst is used. These catalysts are preferred in general for the objects of hydrodesulfurization and hydrodenitrification because they have higher performance of hydrogenation, but at the same time, they have the demerit that the loss of usefulcomponents, BTX, due to their hydrogenation performance occurs very easily, which is greater than in the case of Co—Mo system catalyst.

SUMMARY OF THE INVENTION

The object of the present invention is to provide a novel process for refining aromatic raw materials, which simultaneously satisfies both the requirements of higher desulfurization rate and higher BTX recovery rate. These requirements have been considered to be mutually inconsistent with use of even Co—Mo system catalyst, and particularly, Ni—Mo system and Ni—Co—Mo system catalyst.

The process of the present invention is one of the processes for desulfurizing and refining aromatic raw materials, which process comprises hydrotreating hydrocarbon fractions containing large quantities of aromatic compounds and organic sulfur compounds as impurities in the presence of a catalyst selected from Co—Mo system, Ni—Mo system and Ni—Co—Mo system hydrogenation catalysts so as to convert the organic sulfur compounds to hydrogen sulfide, and removing thus formed hydrogen sulfide, and is characterized in that the hydrotreating operation is commenced after subjecting the catalyst to preliminary sulfurization treatment by contacting the catalyst with hydrogen and a hydrocarbon containing thiophenes, and that the hydrotreating is carried out at a temperature between 200° and 400° C., preferably 250° to 350° C.

It has been generally known to preliminary sulfurize Co—Mo system, Ni—Mo system and Ni—Co—Mo system catalyst by contacting the catalyst with a certain sulfur compound, and the treatment has been practiced as useful for adjusting the hydrogenation activity.

However, all the known pretreating methods use, as the sulfurizing agent, hydrogen sulfide or organic sulfur compounds of low decomposing temperature such as carbon disufide $CS_2$, methyl mercaptan $CH_3SH$, dimethyl sulfide $(CH_3)_2S$ or dimethyl disulfide $(CH_3)_2S_2$. The reason why such compounds have been used is that they are very reactive, and therefore, the preliminary sulfurization proceeds quickly. Thiophenes have never been considered useful as a sulfurizing agent until the present invention, because sulfur atom of thiophene costitutes a member of the hetero-ring of thiophene, and makes the compound stable.

We have not yet clarified the mechanism giving unique merit of preliminary sulfurization using thiophenes in accordance with the present invention, i.e., simultaneous achievement of a higher desulfurization rate and a decreased hydrogenation rate of the aromatic nuclei, comparing with the preliminary sulfurization using the conventional sulfurization agents. However, we assume that the differrence in electron densities of sulfur atoms has some relation to the different effect of the sulfurization agents. More particularly, the electron densities of sulfur atoms in the compounds of the group mentioned above, e.g., dialkyl sulfide, seems to be high (δ—) due to the inductive effect. On the other hand, electrons of the sulfur atom in thiophene flow out because of the resonance structure inherent in this compound to cause electron deficiency (δ+). The difference of the electron densities of the sulfur atom probably results in the difference in absorbing site on the catalyst surface.

The present process for desulfurizing and refining easily achieves, as shown in the working examples described later, desulfurization rate of 99 wt. % or higher, in some preferred embodiments, even 99.8 wt. % or higher, and simultaneously, nuclear hydrogenation loss of BTX of 1 mol % or less.

DRAWING

The attached single drawing is a graph showing the changes of residual sulfur content and aromatic nuclear hydrogenation rate during the preliminary sulfurization treatment and subsequent desulfurizing and refining in an Example of the present invention.

DESCRIPTION OF PREFERRED EMBODIMENTS

The preliminary sulfurization treatment of the Co—Mo system, Ni—Mo system or Ni—Co—Mo system catalyst using thiophenes is carried out by contacting the untreated catalysts with the hydrocarbon to which thiophenes are added in an amount of 100 to 1,000 ppm in terms of sulfur together with hydrogen at a suitable temperature, preferably above the operation temperature, more preferably about 50° C. higher than the operation temperature.

The degree of the sulfurization of the catalyst (hereinafter referred to as "Degree of Sulfurizing") should be such that the sulfur content in the catalyst after the treatment is 20 to 60 wt. %, preferably 25 to 45 wt. % of the assumed maximum sulfur content which is calculated in terms of $MoS_2$ for Mo, $Ni_3S_2$ for Ni and $Co_9O_8$ for Co, respectively.

According to our experience, in order to achieve a desulfurization rate of 99 wt. % or higher (residual sulfur content 3 ppm or less) in the case of treating a raw material containing 300 ppm (in terms of sulfur) of the organic sulfur compounds such as thiophene as the impurities under the operation conditions typical in the present invention, for example, temperature: 300° C., pressure: 60 $Kg/cm^2$, molar ratio of $H_2$/oil: 1.0 and liquid space velocity: 6 $hr^{-1}$, it is necessary to use a catalyst of the degree of sulfurizing of at least 20 wt. %. On the other hand, in order to suppress the loss of BTX by hydrogenation of aromatic nuclei to 1 mol % at highest, the degree of sulfiding of the catalyst should not exceed 60 wt. %. So as to satisfy the requirement of the desulfurization rate of 99.8 wt. % or higher (desulfurization rate of 99.7 wt. % corresponds to residual sulfur content not higher than 1 ppm), 25 wt. % or higher degree of sulfurizing is necessary, while a lower nuclear hydrogenation is desired, the degree of sulfiding of the catalyst not higher than 45 wt. % is preferred.

The above noted preferable ranges of the degree of sulfiding of the catalyst can be easily realized by the preliminary sulfurization treatment according to the present invention. The total performance of the catalyst is, as readily understood from the above description, decided not only by the degree of sulfiding. For example, in the case of the conventional sulfurization using dialkyl (di-) sulfide, the resulting catalyst having a degree of sulfiding in the above mentioned preferred range exhibits so insufficient hydrogenation activity that the desulfurization rate of the raw BTX is 99 wt. % at highest, whereas the catalyst of the degree of sulfiding of 50 to 60 wt. % giving the highest desulfurization causes the loss by aromatic nuclear hydrogenation as high as 1.5 mol %.

The degree of sulfiding of the preliminary sulfurization treatment depends principally on the concentration of thiophenes and the temperature, and partly on the length of the treating time. Our experience taught that, in general, it gives a good result to carry out the preliminary sulfurization using a relatively low concentration of thiophenes, say, 1,000 ppm in terms of sulfur, and spending a relatively long time, say, 50 to 100 hours or more. This was quite unexpectable from the common knowledge in the art that the treatment should be carried out by using a high concentration of sulfurization agent, say, 10,000 ppm.

In the case where, for example, a raw material containing 300 ppm of thiophene in terms of sulfur is to be desulfurized and refined, it is even possible to use the raw material itself as the sulfurization agent in the preliminary sulfurization treatment of the present invention. Such treatment can be effectively carried out with slight modifications, such as a temperature increased to 50° C. above the expected operation temperature, and a liquid space velocity decreased to about a half of that in the practical operation. However, it should be noted that, as seen in the latter described Examples, hydrogenation of aromatic nuclei occurs to a considerable extent during the preliminary sulfurization treatment. Due to the hydrogenation in this step which lasts for a relatively long time, the loss of the aromatic components may be a significant amount.

Accordingly, it is considered advantageous to use a hydrocarbon fraction which mainly comprises paraffinic or naphthanic hydrocarbons and contains no or little amount of aromatic components, and has the similar boiling point range to that of the raw material as the carrier of the sulfurization agent, to conduct the preliminary sulfurization using the hydrocarbon on which thiophenes are carried, to remove the formed hydrogen sulfide from the carrier hydrocarbon, and then to add thiophenes to the hydrocarbon after the removal of hydrogen sulfide so as to recycle the hydrocarbon replenished with thiophenes for reuse. This embodiment is recommended in practice of the present invention.

The above description concerning the use of thiophenes as the sulfurization agent is directed only to the case of feeding thiophenes by mixing it in the raw material hydrocarbon. Needless to say, it is possible to achieve the preliminary sulfurization by feeding thiophenes mixed in the hydrogen. Accordingly, by the phrase "hydrogen and hydrocarbon containing thiophenes" it is meant that thiophenes may be contained in either the hydrocarbon or the hydrogen, which are to be contacted with the catalyst, or even in both of them.

If the raw material is a hydrocarbon such as the cracked gasoline containing polymerizable compounds like diolefines, desulfurization and refining can be performed by subjecting the hydrocarbon firstly to the hydrogenation using a catalyst capable of hydrogenating at a low temperature, such as palladium catalyst, so as to convert the polymerizable compounds to nonpolymerizable hydrocarbons, and then to the hydrotreating using a catalyst of Co—Mo system, Ni—Mo system or Ni—Co—Mo system which has been treated in accordance with the present invention.

In addition, desulfurization is the major concern of the present process, and therefore, the above explanation concentrates on the desulfurization. However, it should be noted that, if the hydrocarbon fraction contains organic nitrogen compounds, they will be removed simultaneously with the organic sulfur compounds, and that the claimed process includes such embodiments.

ization. $H_2$/oil molar ratio: 1.0, temperature: 280° C., pressure: 60 Kg/cm$^2$, and liquid space velocity: 3 hr$^{-1}$.

The reaction conditions and the results are shown in Table I.

TABLE I

| | Preliminary Sulfurization | | | | Desulfurization and Refining | | | |
|---|---|---|---|---|---|---|---|---|
| Run No. | Agent | Concn. ppm | Temp. (°C.) | Carrier | Degree of Sulfiding (wt. %) | Hydrocarbon | Desulfurization Rate (wt. %) | Denitrification Rate (wt. %) | Nuclear Hydrogenation Rate (mol %) |
| Examples | | | | | | | | | |
| 1 | T | 300 | 280 | B | 34.9 | B | >99.9 | >97.0 | 0.7 |
| 2 | T | 300 | 280 | B | 38.4 | B | >99.3 | >97.0 | 0.34 |
| 3 | T | 300 | 280 | B | 44.0 | B | >99.9 | >97.0 | 0.83 |
| 4 | T | 300 | 280 | BTX | 44.0 | BTX | >99.9 | >97.0 | 0.17 |
| 5 | T | 300 | 280 | BTX | 27.2 | BTX | 99.8 | >97.0 | 0.16 |
| 6 | T | 300 | 320 | BTX | 34.8 | BTX | >99.9 | >97.0 | 0.2 |
| 7 | T | 300 | 340 | BTX | 39.1 | BTX | >99.9 | >97.0 | 0.2 |
| 8 | T | 300 | 350 | BTX | 36.5 | BTX | >99.9 | >97.0 | 0.3 |
| 9 | T | 300 | 350 | BTX | 38.8 | BTX | >99.9 | >97.0 | 0.12 |
| 10 | T | 300 | 350 | BTX | 40.8 | BTX | >99.9 | >97.0 | 0.08 |
| 11 | T | 1,000 | 350 | BTX | 57.5 | BTX | >99.9 | >97.0 | 0.8 |
| 12 | T | 300 | 350 | n-Hx | 37.0 | BTX | >99.9 | >97.0 | 0.25 |
| 13 | T | 300 | 350 | n-Hx | 50.5 | BTX | >99.9 | >97.0 | 0.8 |
| Controls | | | | | | | | | |
| 1 | S | 10,000 | 230 | B | 41.2 | B | 98.0 | 92.0 | 0.75 |
| 2 | S | 10,000 | 300 | B | 57.0 | B | >99.9 | >97.0 | 2.5 |
| 3 | S | 10,000 | 300 | B | 64.1 | B | >99.9 | >97.0 | 3.3 |
| 4 | $S_2$ | 10,000 | 180 | BTX | 45.4 | BTX | >99.9 | >97.0 | 1.02 |
| 5 | $S_2$ | 10,000 | 230 | B | 58.7 | B | >99.9 | >97.0 | 2.4 |
| 6 | $S_2$ | 10,000 | 230 | BTX | 59.6 | BTX | 99.8 | >97.0 | 1.2 |
| 7 | $S_2$ | 1,000 | 200 | B | 51.6 | B | 99.0 | 93.0 | 1.2 |
| 8 | $S_2$ | 10,000 | 300 | B | 61.8 | B | 99.9 | >97.0 | 3.6 |

T: thiophene, S: dimethyl sulfide, $S_2$: dimethyl disulfide
B: benezene, BTX: BTX mixture, n-Hx: n-hexane

EXAMPLE I

In a medium sized flow type reactor, there was packed 30 ml of a Co—Mo system hydrogenation catalyst containing CoO 4.4 wt. % and MoO$_3$ 21.0 wt. %, which were carried on alumina.

Benzene, BTX mixture (B:T:X=5:2:1, volume ratio) or n-hexane, to which thiophene was added to the amount of 300 ppm or 1,000 ppm in terms of sulfur, were introduced in the reactor with hydrogen in such amount that the molar ratio of the hydrogen to the benzene, the BTX mixture or n-hexane is 1.0 so as to preliminarily sulfurize the catalyst. The pressure was 60 Kg/cm$^2$, and the liquid space velocity was 3 hr$^{-1}$. Different temperatures were chosen in the range between 280° and 350° C., and the treating time varied from 50 to 100 hours. Thus, catalyst of various degree of sulfiding were obtained. Analysis of sulfur in the catalysts was made in accordance with the method defined in ASTM E30-47.

For the purpose of comparison, conventional catalysts were prepared by the similar procedures to the above using the conventional sulfurization agents, dimethyl sulfide or dimethyl disulfide, under the conditions of sulfur concentrations varying from 300 to 10,000 ppm, and different temperatures from 180° to 300° C.

As the raw materials, benzene and BTX mixture containing thiophene 300 ppm in terms of sulfur and pyrole 10 ppm in terms of nitrogen were fed to the reactor under the following conditions to perform the desulfur-

EXAMPLE II

BTX mixture containing thiophene 300 ppm in terms of sulfur as the preliminary sulfurization agent was introduced in the same catalyst in the same reactor as Example I under the same reaction conditions except for the temperature, which was 350° C.

After the preliminary sufurization over 125 hours, the temperature was decreased to 300° C., and the desulfurization commenced.

Afterwards, with the varied raw materials and the operation conditions as shown in the attached drawing, desulfurization operation was continued for 1200 hours.

As seen from the graph of the drawing, the experiment gave good results of residual organic sulfur (in terms of sulfur) in the hydrocarbon after the desulfurization as low as 0.2 ppm (desulfurization rate higher than 99.9 wt. %), and the loss of aromatic due to nuclear hydrogenation as little as 0.1 mol %.

EXAMPLE III

Using the same reactor as Examples I and II, the preliminary sulfurization of the same catalyst was tried by feeding hydrogen gas to which thiophene vapor was added to the concentration of 300 ppm as sulfur. The temperature of this treatment was 330° C.

After elapse of 80 hours, when hydrogen sulfide concentration at the outlet of the reactor reached a steady level, the temperature was decreased to 300° C. for the subsequent desulfurization operation. The degree of sulfiding of the catalyst was analyzed to be 43.2 wt. %.

Though there was observed changes to some extent with the passage of time, the catalytic activity became stable after about 10 hours, and there was obtained the results of residual organic sulfur (in terms of sulfur) in the hydrocarbon subjected to the desulfurization of 0.3 ppm (desulfurization rate higher than 99.9 wt. %) and the loss of the aromatics due to nuclear hydrogenation of 0.2 mol %.

EXAMPLE IV

In a medium sized flow type reactor, there was packed 30 ml of a Ni—Mo system hydrogenation catalyst containing NiO 2.9 wt. % and $MoO_3$ 15.8 wt. %, which were carried on alumina.

A straight run naphtha containing no unsaturated component, to which thiophene is added to the amount of 300 ppm or 1,000 ppm in terms of sulfur, was introduced in the reactor with hydrogen in such amount that the molar ratio of the hydrogen to the naphtha is 1.0 so as to preliminarily sulfurize the catalyst. The pressure was 60 $Kg/cm^2$, and the liquid space velocity was 3 $hr^{-1}$. Different temperatures were chosen in the range between 280°, 350° C. and the treating time varied from 50 to 100 hours. Thus, catalysts of various degree of sulfiding were obtained.

For the purpose of comparison, conventional catalysts were prepared by the similar procedures to the above using conventional sulfurization agent, dimethyl disulfide, under the conditions of sulfur concentration varying from 300 to 10,000 ppm, and different temperature from 180° to 300° C.

As the raw material, BTX mixture containing thiophene 300 ppm in terms of sulfur and pyrole 10 ppm in terms of nitrogen was fed to the reactor under the following conditions to perform the desulfurization.

$H_2$/oil molar ratio: 1.0
temperature: 280° C.,
pressure: 60 $Kg/cm^2$, and
liquid space velocity: 3 $hr^{-1}$.

The reaction conditions and the results are shown in Table II.

Then, as the raw material, BTX mixture (B:T:X=5:3:1, volume ratio) containing thiophene 300 ppm in terms of sulfur and pyrol 10 ppm in terms of nitrogen was fed to the reactor under the conditions of $H_2$/oil molar ratio: 1.0, temperature: 300° C., pressure: 60 $Kg/cm^2$, and liquid space velocity: 3 $hr^{-1}$, to perform the desulfurization.

Even 500 hours after the beginning of the desulfurization, the results still remained at so high levels as follows.

desulfurization rate: higher than 99.9 wt. %,
denitrification rate: higher than 97.0 wt. %, and
loss of aromatics due to nuclear hydrogenation: 0.25 mol %.

The degree of sulfiding of the catalyst at this stage was found to be 42% on the basis of sulfur content thereof.

We claim:

1. A process for desulfurizing hydrocarbon fractions containing organic sulfur compounds as impurities and aromatic components by hydrotreating the hydrocarbon fraction so as to convert the organic sulfur compounds to hydrogen sulfide with a catalyst selected from Co—Mo system, Ni—Mo system and Ni—Co—Mo system catalysts, and by removing thus formed hydrogen sulfide, which process is characterized in that the catalyst is subjected to preliminary sulfurization treatment with thiophenes by being contacted with hydrogen and a hydrocarbon containing thiophenes, and that the hydrotreating is carried out at a temperature between 200° and 400° C.; wherein the sulfurization treatment is carried out at a temperature sufficiently higher than the hydrotreating, whereby the catalyst is sulfurized.

2. A process according to claim 1, wherein the preliminary sulfurization treatment is conducted to such

TABLE II

| | | Preliminary Sulfurization | | | | Desulfurization and Refining | | | |
|---|---|---|---|---|---|---|---|---|---|
| Run No. | Agent | Concn. ppm | Temp. (°C.) | Carrier | Degree of Sulfiding (wt. %) | Hydrocarbon | Desulfurization Rate (wt. %) | Denitrification Rate (wt. %) | Nuclear Hydrogenation Rate (mol %) |
| Examples | | | | | | | | | |
| 1 | T | 300 | 280 | | 42.3 | BTX | >99.9 | >97.0 | 0.34 |
| 2 | T | 300 | 280 | | 40.2 | BTX | >99.9 | >97.0 | 0.40 |
| 3 | T | 300 | 330 | | 51.1 | BTX | >99.9 | >97.0 | 0.64 |
| 4 | T | 300 | 330 | | 48.7 | BTX | >99.9 | >97.0 | 0.57 |
| 5 | T | 300 | 350 | Straight | 53.4 | BTX | >99.9 | >97.0 | 0.7 |
| 6 | T | 300 | 300 | run | 45.0 | BTX | >99.9 | >97.0 | 0.42 |
| 7 | T | 1,000 | 280 | naphtha | 38.2 | BTX | >99.9 | >97.0 | 0.34 |
| Controls | | | | | | | | | |
| 1 | $S_2$ | 1,000 | 280 | | 52.0 | BTX | >99.9 | >97.0 | 4.3 |
| 2 | $S_2$ | 10,000 | 300 | | 74.3 | BTX | >99.9 | >97.0 | 10.4 |
| 3 | $S_2$ | 10,000 | 230 | | 43.1 | BTX | 98.0 | 90.0 | 0.52 |

T: thiophene, $S_2$: dimethyl disulfide

EXAMPLE V

In the same reactor as used in Example I, there was packed 30 ml of a Ni—Co—Mo system hydrogenation catalyst containing NiO 2.0 wt. %, CoO 3.5 wt. % and $MoO_3$ 10.0 wt. %, which were carried on alumina.

A straight run naphtha, to which thiophene is added to the amount of 300 ppm in terms of sulfur, was introduced in the reactor with hydrogen in such amount that the molar ratio of the hydrogen to the naphtha is 1.0 so as to preliminarily sulfurize the catalyst. The pressure was 60 $Kg/cm^2$, the liquid space velocity, 3 $hr^{-1}$, the temperature, 330° C., and the treating time lasted 100 hours.

degree that the sulfur content in the catalyst after the treatment is 20 to 60 wt. %, of the assumed maximum sulfur content which is calculated in terms of $MoS_2$ for Mo, $Ni_3S_2$ for Ni and $Co_9S_8$ for Co, respectively.

3. A process according to claim 1, wherein the hydrotreating is carried out at a temperature between 250° and 350° C.

4. A process according to claim 1, wherein the hydrocarbon containing hydrogen sulfide formed by the preliminary sulfurization treatment is deprived of a major portion of hydrogen sulfide, and after being replenished with thiophenes, the hydrocarbon is circulated for reuse in the preliminary sulfurization treatment.

5. A process according to claim 1, wherein a hydrocarbon fraction of low aromatic concentration is used as the hydrocarbon to which thiophene is added for the preliminary sulfurization treatment.

6. A process according to claim 1 for the case where the hydrocarbon to be subjected to the hydrotreating contains polymerizable compounds, wherein the hydrocarbon is firstly hydrogenated with a catalyst capable of hydrogenating at a low temperature sufficient to avoid the polymerization to change the polymerizable compounds to non-polymerizable hydrocarbons, and then the hydrocarbon is hydrotreated with the Co—Mo system, Ni—Mo system or Ni—Co—Mo system catalyst.

7. The process according to claim 2 wherein the sulfur content of the catalyst after the preliminary sulfurization treatment is 25 to 45 wt. % of said assumed maximum sulfur content.

8. The process according to claim 1 wherein the polymerizable compounds are diolefins.

9. The process according to claim 1 wherein the concentration of thiophene in the hydrocarbon for the preliminary sulfurization is 1,000 ppm or lower in terms of sulfur.

10. The process according to claim 1 wherein the preliminary sulfurization is carried out for 50 hours or longer.

11. The process according to claim 1, wherein the sulfurization treatment is carried out at a temperature of 30° C. to 70° C. higher than hydrotreating step.

12. A process for desulfurizing hydrocarbon fractions containing organic sulfur compounds as impurities and aromatic components by hydrotreating the hydrocarbon fractions so as to convert the organic sulfur compounds to hydrogen sulfide with a catalyst selected from Co—Mo system, Ni—Mo system and Ni—Co—Mo system catalysts and by removing the thus formed hydrogen sulfide without affecting the aromatic compounds, which process is characterized in that the catalyst is subjected to preliminary sulfurization treatment with thiophenes by being contacted with hydrogen and a hydrocarbon containing the thiophenes so that the catalyst is sulfurized to a sulfur content of 20 to 60 wt. % of the assumed maximum sulfur content which is calculated in terms of $MoS_2$ for Mo, $Ni_3S_2$ for Ni, and $Co_9S_8$ for Co, respectively, and that the hydrotreating is carried out at a temperature between 200° and 400° C.

13. The process according to claim 12 wherein the desulfurization is 99 weight percent or higher and the loss of aromatic hydrocarbons is 1 mole percent or less.

14. The process according to claims 1 or 12, wherein 100 to 1,000 ppm of the thiophene in terms of sulfur are added to the hydrocarbon for the sulfurization treatment.

15. The process according to claims 1 or 12 wherein the aromatic components are benzene, toluene, xylenes or a mixture thereof.

16. A process for desulfurizing impurities of organic sulfur compounds from a fraction containing aromatic compounds, which comprises:
(1) converting the organic sulfur compounds to hydrogen sulfide by
  (a) sulfurizing a catalyst selected from the group consisting of a Co—Mo system, Ni—Mo system and Ni—Co—Mo system with thiophenes by contacting the catalyst with hydrogen and a hydrocarbon containing the thiophenes, then
  (b) hydrotreating the fraction with the resultant catalyst at a temperature between 200 and 400° C., and
(2) removing the thus-formed hydrogen sulfide, wherein the sulfurization step and hydrotreating step are carried out at different reaction conditions, so that the catalyst is sulfurized during the sulfurizing step to a sulfur content of 20 to 60 wt. % of its assumed maximum, and the organic sulfur compounds are converted to hydrogen sulfide during the hydrotreating step.

17. The process according to claim 16, wherein the sulfurizing step is conducted at a higher temperature than the hydrotreating step.

18. The process according to claim 17, wherein the sulfurizing step is conducted at a temperature about 50° C. higher than the hydrotreating step.

* * * * *